2 Sheets--Sheet 2.
J. K. SAX & G. W. KEAR.
Casting Car-Wheels.
No. 154,284. Patented Aug. 18, 1874.
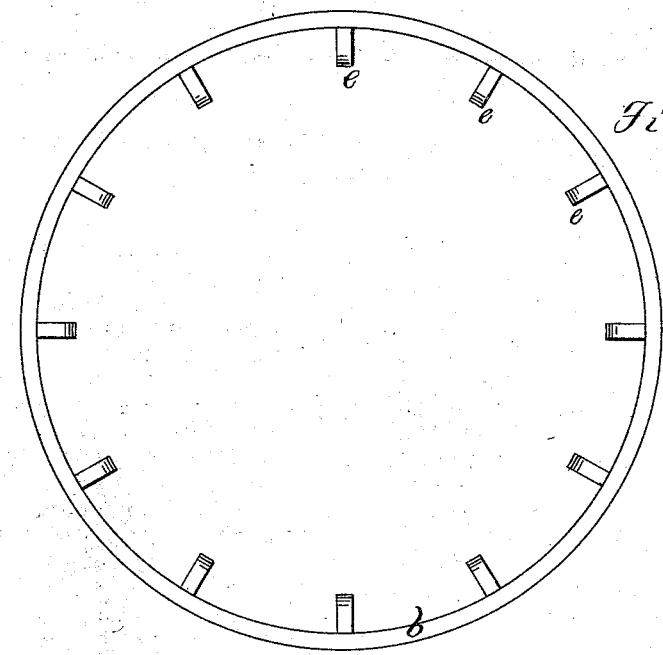
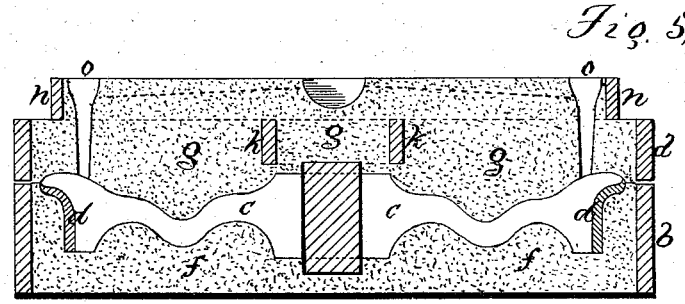
Witnesses.
F. G. Fuller
John Pollitt
Inventors.
John K. Sax
George W. Kear
By W. E. Simonds
their atty.

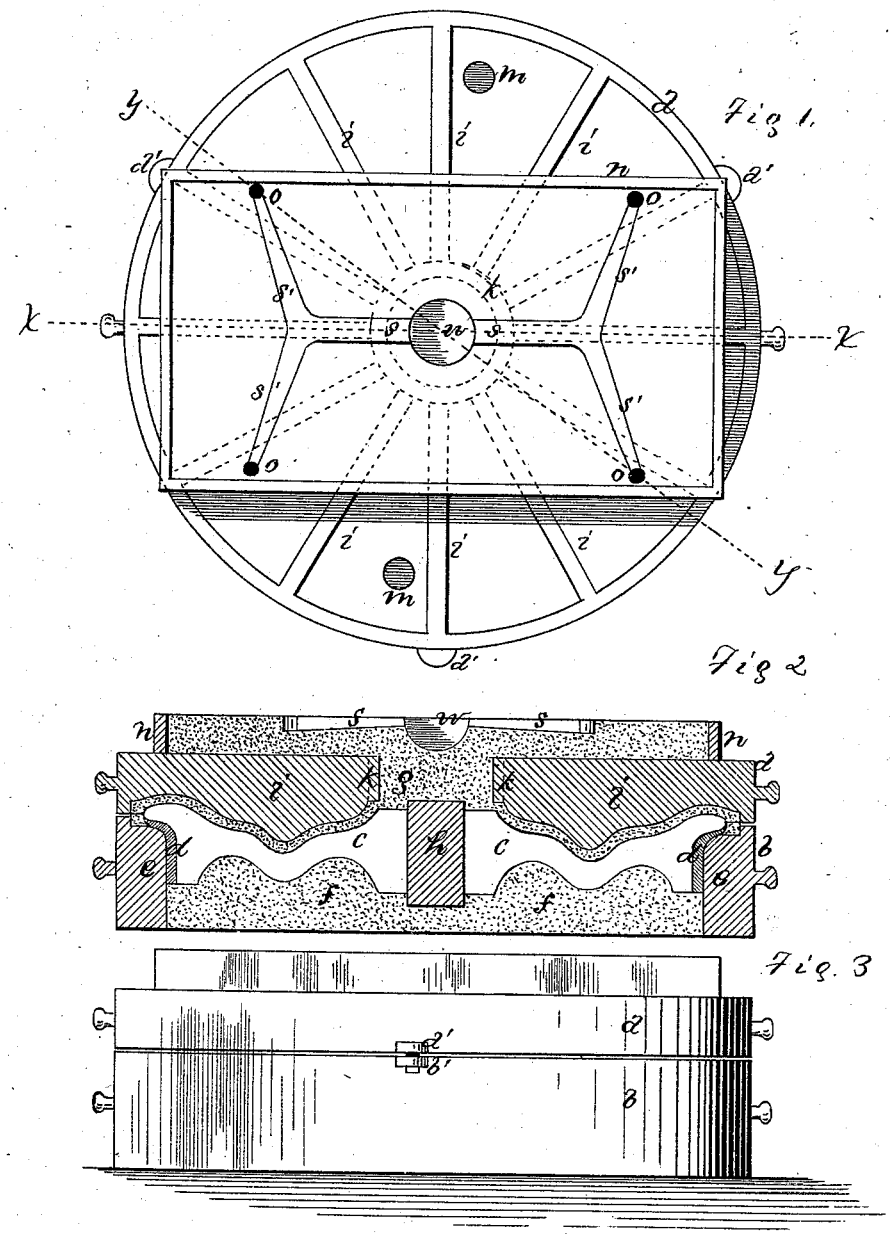

UNITED STATES PATENT OFFICE.

JOHN K. SAX, OF PITTSTON, AND GEORGE W. KEAR, OF KINGSTON, PA.

IMPROVEMENT IN CASTING CAR-WHEELS.

Specification forming part of Letters Patent No. 154,284, dated August 18, 1874; application filed December 17, 1872.

*To all whom it may concern:*

Be it known that we, JOHN K. SAX, of Pittston, in the county of Luzerne and State of Pennsylvania, and GEORGE W. KEAR, of Kingston, in said county and State, have invented certain new and useful Improvements in Molds and Process for Casting Metallic Car-Wheels having steel tires, of which the following is a specification, reference being had to the accompanying drawings, in which—

Figure 1 is a top or plan view of the mold employed. Fig. 2 is a central vertical sectional view of the same through the plane indicated by the dotted line $x$ $x$ in Fig. 1. Fig. 3 is a side elevation or view of the mold shown in Fig. 1. Fig. 4 is a top view of the "drag" or lower part of the mold. Fig. 5 is a central vertical sectional view of the mold shown in Fig. 1 through the plane indicated by the dotted line $y$ $y$, in Fig. 1.

Letters Patent number 88,743, dated April 6, 1869, were issued to us for certain new and useful improvements in car-wheels, which said Letters Patent were duly reissued, dated May 3, 1870, the invention described therein being, speaking in general terms, a car-wheel, having a cast-iron body and a steel tread or tire, the cast-iron body being welded to the steel tire in the mold, the tire being first heated to a proper degree, then placed in the mold, and then the molten iron poured in to form the body of the wheel, the body and tire coming out perfectly welded together.

The present invention relates to so constructing the mold for casting such wheels that the molten iron may be introduced into the mold at different points simultaneously at or near the inner side of the tire, so that the metal will flow from the circumference toward the center, the lengthened contact of the hot metal with the tire availing, of itself, to heat the tire, so that in using thin tires the preliminary heating thereof may be entirely dispensed with, and in using tires of greater thickness some or a great part of such preliminary heating may be dispensed with.

Referring to the drawings, the letter $a$ indicates the cap or upper part of a round wheel-flask sitting upon the drag or lower portion of the flask, the two parts of the flask held in proper positions relative to each other by the dowel-pins $a'$ projecting from the cap $a$ and fitting into corresponding sockets in the lugs $b'$ projecting from the drag $b$. The letter $c$ indicates the open space in the mold to be filled with molten iron to form the body of the wheel. The letter $d$ indicates the steel tire placed in the mold preparatory to casting the iron body. This tire rests upon and is supported by the wings $e$ attached to the inner side of the drag. The letter $f$ indicates the molding-sand in the drag. $g$ indicates the molding-sand in the cap or upper part of the mold. $h$ indicates the core which forms the central opening in the wheel for the axle. The cap $a$ has radial arms $i$ extending from the outer ring to the central ring $k$, the lower outline of which arms follows the contour of the upper side of the wheel, but they do not touch the wheel. The letters $m$ indicate sprue-holes in the sand, into which the metal will rise when the mold is full, thus giving notice that the pouring may stop. When the two parts $a$ and $b$ of the flask have been properly filled with sand, we place upon the top of the cap $a$ the runner-box $n$, which has neither top nor bottom, only sides. This runner-box is also filled with sand. Conduits or sprue-holes $o$, more or less in number, but preferably four, are left leading into the mold at or near the inner side of the tire from the surface of the sand in the runner-box. These conduits are connected by channel-ways $s$ $s'$ scooped out in the sand, with the central pouring-basin W, also scooped out in the sand, which is somewhat deeper than the channel-ways $s$, so that the metal will rise as it is poured and run off through the channel-ways to the conduits by which it enters the mold.

It will be readily understood that by thus introducing the molten metal at or near the inner side of the tire, the tire will become greatly heated by the time the metal is all poured.

We do not claim as our invention, so far as these Letters Patent are concerned, anything hereinbefore described, except what is expressly specified in the following claim.

We do claim as our invention—

The mode or process described of making a wheel with a cast-metal body and steel tire welded together, such process consisting in introducing the molten metal into the mold at different points simultaneously at or near the inner side of the tire, substantially as described.

JOHN K. SAX,
GEORGE W. KEAR.

Witnesses:
WM. E. SIMONDS,
R. B. BROCKWAY.